(12) United States Patent
Schleich

(10) Patent No.: US 10,107,366 B2
(45) Date of Patent: Oct. 23, 2018

(54) SPUR-GEAR PLANETARY GEARBOX WITH MULTIPLE RATIOS

(71) Applicant: Bayerische Motoren Werke Aktiengesellschaft, Munich (DE)

(72) Inventor: Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/599,684

(22) Filed: May 19, 2017

(65) Prior Publication Data

US 2017/0254391 A1 Sep. 7, 2017

Related U.S. Application Data

(63) Continuation of application No. PCT/EP2015/076173, filed on Nov. 10, 2015.

(30) Foreign Application Priority Data

Nov. 25, 2014 (DE) .......................... 10 2014 223 916

(51) Int. Cl.
*F16H 3/66* (2006.01)
*F16H 3/44* (2006.01)

(52) U.S. Cl.
CPC .............. *F16H 3/66* (2013.01); *F16H 3/663* (2013.01); *F16H 2003/445* (2013.01);
(Continued)

(58) Field of Classification Search
None
See application file for complete search history.

(56) References Cited

U.S. PATENT DOCUMENTS 3,572,164 A * 3/1971 Smith ..................... F16H 47/04
475/81
3,580,107 A 5/1971 Orshansky, Jr.
(Continued)

FOREIGN PATENT DOCUMENTS

CN 1496456 A 5/2004
CN 102072291 A 5/2011
(Continued)

OTHER PUBLICATIONS

German Search Report issued in counterpart German Application DE 10 2014 223 916.8 dated Sep. 16, 2015 with partial English translation (nine (9) pages).
(Continued)

*Primary Examiner* — Justin Holmes
(74) *Attorney, Agent, or Firm* — Crowell & Moring LLP

(57) ABSTRACT

A spur-gear planetary gearbox with multiple ratios has a spur-gear gearbox with at least one first idler gear arranged concentrically to a spur-gear shaft, and a spur gear connected to this spur-gear shaft, a planetary gear mechanism with a first planetary gear set and a second planetary gear set and a planetary gear shaft rotatable about a planetary gear mechanism axis. One of the planetary gear sets is arranged concentrically to the planetary gear mechanism axis. A first planetary gear and a second planetary gear arranged concentrically to the planetary gear mechanism axis. A gear box and a plurality of speed changing devices are provided, wherein the first idler gear meshes with the first planetary gear, and the spur gear meshes with the second planetary gear. The planetary gearbox is characterized in that a second idler gear is arranged on the spur-gear shaft and can be selectively connected thereto in a torque-transmitting manner. The first idler gear can be selectively connected to the gear box in a torque-transmitting manner, and a third plan-
(Continued)

etary gear is arranged concentrically to the planetary gear train axis and meshes with the second idler gear.

14 Claims, 1 Drawing Sheet

(52) U.S. Cl.
CPC ............... *F16H 2200/0056* (2013.01); *F16H 2200/2005* (2013.01); *F16H 2200/2023* (2013.01); *F16H 2200/2048* (2013.01); *F16H 2200/2064* (2013.01); *F16H 2200/2094* (2013.01)

(56) References Cited

U.S. PATENT DOCUMENTS

| | | | |
|---|---|---|---|
| 3,714,845 A * | 2/1973 | Mooney, Jr. | F16H 47/04 |
| | | | 475/81 |
| 3,915,033 A * | 10/1975 | Polak | F16H 3/66 |
| | | | 475/286 |
| 4,788,887 A | 12/1988 | Lepelletier | |
| 5,013,289 A * | 5/1991 | Van Maanen | F16H 3/66 |
| | | | 475/218 |
| 5,503,605 A * | 4/1996 | Beim | F16H 3/62 |
| | | | 475/218 |
| 5,520,588 A | 5/1996 | Hall, III | |
| 5,593,359 A * | 1/1997 | Justice | F16H 3/66 |
| | | | 475/280 |
| 2003/0104896 A1 | 6/2003 | Ohkubo | |
| 2004/0092357 A1 | 5/2004 | Biermann | |
| 2010/0029433 A1 | 2/2010 | Tenberge | |
| 2011/0124464 A1 | 5/2011 | Sung | |
| 2012/0122624 A1* | 5/2012 | Hawkins, Jr. | F16H 37/086 |
| | | | 475/219 |
| 2012/0149528 A1 | 6/2012 | Hoffman | |
| 2014/0141928 A1* | 5/2014 | Lee | F16H 3/66 |
| | | | 475/284 |
| 2014/0171253 A1 | 6/2014 | Lee et al. | |
| 2015/0087469 A1 | 3/2015 | Beck | |
| 2016/0017959 A1 | 1/2016 | Beck | |

FOREIGN PATENT DOCUMENTS

| | | |
|---|---|---|
| CN | 103867659 A | 6/2014 |
| DE | 10 2007 014 150 A1 | 9/2008 |
| DE | 10 2012 001 846 A1 | 8/2013 |
| DE | 10 2012 207 028 A1 | 10/2013 |
| DE | 10 2012 221 073 A1 | 5/2014 |
| DE | 10 2013 113 743 A1 | 6/2014 |
| JP | 2009-63139 A | 3/2009 |

OTHER PUBLICATIONS

International Search Report (PCT/ISA/210) issued in PCT Application No. PCT/EP2015/076173 dated Feb. 9, 2016 with English translation (five (5) pages).

German-language Written Opinion (PCT/ISA/237) issued in PCT Application No. PCT/EP2015/076173 dated Feb. 9, 2016 (fourteen (14) pages).

Chinese-language Office Action issued in counterpart Chinese Application No. 201580048965.0 dated Jul. 2, 2018 with English translation (15 pages).

* cited by examiner

| Shifting Diagram | | | | | | | |
|---|---|---|---|---|---|---|---|
| | 1.SE | 2.SE | 3.SE | 4.SE | 5.SE | 6.SE | 7.SE |
| R. Gear | ▨ | ▨ | | | | | |
| 1st Gear | | ▨ | ▨ | | | | |
| 2nd Gear | | ▨ | | ▨ | | | |
| 3rd Gear | | ▨ | | ▨ | | | |
| 4th Gear | | ▨ | | | ▨ | | |
| 5th Gear | | | | | ▨ | | |
| 6th Gear | | | | ▨ | | | ▨ |
| 7th Gear | | | | | ▨ | | ▨ |

SPUR-GEAR PLANETARY GEARBOX WITH MULTIPLE RATIOS

CROSS REFERENCE TO RELATED APPLICATIONS

This application is a continuation of PCT International Application No. PCT/EP2015/076173, filed Nov. 10, 2015, which claims priority under 35 U.S.C. § 119 from German Patent Application No. 10 2014 223 916.8, filed Nov. 25, 2014, the entire disclosures of which are herein expressly incorporated by reference.

BACKGROUND AND SUMMARY OF THE INVENTION

The invention relates to a spur-gear planetary gearbox with a plurality of discrete switching stages; in this instance, this gearbox has a spur gear mechanism and a planetary gear mechanism. Such a gearbox is known from DE 10 2012 207 028 A1.

The invention is described below with reference to a gear device for use in a passenger vehicle. This is not intended to be understood to be a limitation of the invention.

In motor vehicles, high demands are placed on the compactness and efficiency of drive components. The capacity of drive machines such as electric motors and internal combustion engines is constantly being increased; the efficiency thereof is dependent inter alia on the operating location/range. The gear device in a vehicle is responsible for adapting the load demands on the drive machine in such a manner that it can be operated with a high degree of efficiency. This can be achieved by means of an adequate gear spread and stepping and low levels of gear loss with at the same time a small structural size.

To this end, DE 10 2012 207 028 A1 proposes a gear device in which a spur gear mechanism is combined with a planetary gear mechanism with at least two sets of planetary gears. The driving is carried out in this gear mechanism by means of a sun pinion shaft of the planetary gear mechanism, the output is carried out by means of a shaft of the spur gear mechanism.

An object of the invention is to provide a combined spur-gear planetary gearbox with a small spatial requirement.

This object is achieved with a combined spur-gear planetary gearbox according to embodiments of the invention.

In the context of the invention, a spur-gear planetary gearbox is intended to be understood to be a gear device which has a plurality of transmission ratios (ratio, drive speed to output speed). These transmission ratios can preferably be selectively adjusted by means of a large number of switching devices, in particular in discrete stages. A spur-gear planetary gearbox is intended in this context to be understood to be a switching gear device for a passenger vehicle having a large number of, preferably five or more, preferably six or more and in a particularly preferred manner seven or more, forward gears and one or more reverse gears. In this context, a gear is intended to be understood to be a discrete transmission ratio of the gear device. This spur-gear planetary gearbox has in particular at least two part-gear mechanisms, of which a first part-gear mechanism is a spur gear mechanism and a second gear mechanism has at least one planetary gear mechanism which has at least a first planetary gear set and a second planetary gear set. In a further preferred manner, at least one of these planetary gear sets is constructed as a reduced planetary gear set. Preferably, this first planetary gear set and this second planetary gear set can be connected to each other.

In the context of the invention, a spur gear mechanism is intended to be understood to be a gear device which has in particular externally toothed spur gears, planetary gears and idler gears, wherein these toothed wheels are each arranged concentrically with respect to two axles which are axially parallel with each other. In the context of the invention, these toothed wheels are intended to be understood to be an at least substantially cylindrical toothed wheel with a tooth arrangement which is arranged at the outer side on the cylinder. In particular such a toothed wheel has an involute tooth arrangement for transmitting movement and force, wherein this tooth arrangement is preferably constructed as a spur tooth or preferably helical tooth arrangement.

Preferably, a spur gear mechanism has at least a first and a second toothed wheel which are arranged on a spur gear shaft. Furthermore, one of these toothed wheels can be connected to the spur gear shaft (second idler gear) in a selective and torque-transmitting manner and furthermore an additional toothed wheel can be connected to this second idler gear in a selective and torque-transmitting manner (first idler gear). The spur gear shaft is rotatably supported about the first of these axially parallel axles. Preferably, another toothed wheel is arranged on the spur gear shaft and can be connected thereto (spur gear), in particular is connected in a permanent, rotationally secure manner. In a further preferred manner, the first idler gear and the spur gear mesh with two additional toothed wheels (first, second planetary gear), wherein they are in each case arranged concentrically with respect to a planetary axle and the planetary axle (second of the axially parallel axles) is orientated in an axially parallel manner with the spur gear shaft (first of the axially parallel axles). These toothed wheels are in this instance arranged in pairs in such a manner that the first planetary gear can be contacted by the first idler gear for transmission of movement and force (toothed wheels mesh with each other) and the second planetary gear can be contacted by the spur gear for transmission of movement and force. Furthermore, the second idler gear meshes with a third planetary gear.

In a further preferred manner, at least one of the two idler gears can be connected to the gear housing in a selective and torque-transmitting manner. Preferably, such a connection can be constructed at least partially or completely as a frictionally engaging connection (braked idler gear). Preferably, a known example of an at least partially frictionally engaging connection may be understood to be a known synchronization in which firstly, by means of a friction contact, a speed alignment takes place between the components which are intended to be braked with respect to each other (idler gear/gear housing) and subsequently a positive-locking connection can be brought into engagement. In a further preferred manner, at least one of the idler gears can be connected by means of a positive-locking or frictionally engaging connection to the gear housing in a selective and torque-transmitting manner.

In the context of the invention, a planetary gear mechanism is intended to be understood to be a gear device having at least a first planetary gear set and a second planetary gear set. In a further preferred manner, this planetary gear mechanism is preferably arranged completely or preferably at least partially concentrically with respect to this planetary axle. A combination of a sun pinion, a ring gear, at least one planetary gear and preferably a planetary gear carrier may be understood to be a planetary gear set. Preferably, a planetary gear set has at least one planetary gear which meshes with the ring gear and at least one sun gear which meshes with this planetary gear, and a planetary gear carrier which is configured to support the planetary gear.

Furthermore, a planetary gear set without a sun pinion or alternatively without a ring gear may in this context be understood to be a so-called "reduced planetary gear set".

In a further preferred manner, the output from this planetary gear mechanism is carried out by means of a planetary gear shaft which is preferably arranged concentrically with the planetary axle.

Preferably, the planetary gear mechanism has at least a first and a second planetary gear set. Preferably, drive power can be supplied to the planetary gear mechanism by means of the first planetary gear set. In a further preferred manner, the output is carried out via the second planetary gear set. Preferably, one of these planetary gear sets of the planetary gear mechanism is intended to be understood to be a reduced planetary gear set. Preferably, at least one of the elements (sun pinion, planetary gear, planetary gear carrier, ring gear) of the first planetary gear set can be connected to at least one of the elements (sun pinion, planetary gear, planetary gear carrier, ring gear) of the second planetary gear set, in particular in a selective manner. In particular as a result of the selective connection of different elements, different transmission ratios can be adjusted.

Preferably, individual elements (sun pinion, planetary gear, planetary gear carrier, ring gear) of the first planetary gear set are connected to elements (sun pinion, planetary gear, planetary gear carrier, ring gear) of the second planetary gear set. In particular as a result of the connection of different elements of the planetary gear sets, which connection is non-releasable at least during normal operation of the planetary gear, specific kinematics of the planetary gear mechanism can be at least partially predetermined and a small construction space requirement with respect to a selective connection can be achieved.

Preferably, the planetary gear mechanism is intended to be understood to be a combination of this first planetary gear set and this second reduced planetary gear set. Such arrangements are described in particular as a reduced coupling set. In a further preferable manner, this planetary gear mechanism is intended to be understood to be a so-called Ravigneaux gear set; in this instance, the term "Ravigneaux gear set" particularly refers to a specific arrangement of a reduced coupling set. In the context of the invention, a Ravigneaux set is intended to be understood to be a planetary gear mechanism in which two planetary gears which mesh with each other are rotatably supported on a common planetary gear carrier and, furthermore, this Ravigneaux set has a first and a second sun pinion, but only one ring gear. The so-called Ravigneaux gear set can be constituted in particular by means of a reduced planetary gear set and a particularly compact construction of the gear device can be achieved.

In the context of the invention, a gear housing is intended to be understood to be a device which is provided to receive the spur gear mechanism and the planetary gear mechanism, in particular to rotatably support the spur gear shaft and the planetary gear shaft. In a further preferred manner, the gear housing is configured to receive a lubricant.

In the context of the invention, a switching device is intended to be understood to be a device for positive-locking, frictionally engaging or positive-locking/frictionally engaging mutual connection of two structural members, components or devices of the gear mechanism and furthermore, a force or a torque can thereby be transmitted between these two components. Preferably, a switching device is intended to be understood to be a device which is selected from a group, this group having at least the following elements:

synchronization device, in particular cone synchronization,
multiple disk clutch or brake,
shoe brake or jaw clutch,
gear coupling,
sliding sleeve device,
or a combination of at least two of the above-mentioned devices.

Preferably, a switching device in this context is intended to be understood to be a device for connecting, in particular one of the toothed wheels, one of the shafts, the planetary gear carrier or the gear housing, in particular to another of the toothed wheels, the shafts, the planetary gear carrier or the gear housing. Preferably, a switching device forms at least one friction pairing in particular by means of friction plates or friction cones or preferably a positive-locking connection, in particular by means of claws, hooks, tooth arrangements or a sliding sleeve.

In a further preferred manner, at least one of these switching devices, preferably a plurality and in a particularly preferred manner all of them is/are constructed as a power-shift-enabled switching device and the forces/torques between the components which are configured for coupling can be transmitted at least partially or completely in a frictionally engaging manner. In particular, switching devices with at least partially frictionally engaging torque transmission enable power shifting or a switching of the spur gear planetary gearbox without any interruption of the tractive force and consequently an improved gear mechanism can be constituted.

Preferably, a switching device has a combination of at least two of the previously mentioned devices, preferably a sliding sleeve having at least one friction cone or at least one friction plate.

In the context of the invention, the selective connection in a torque-transmitting manner is intended to be understood to mean that two components, in particular shafts, toothed wheels, the planetary gear carrier or portions of the gear housing can be connected to each other by actuating one of the switching devices so that a torque can be transmitted between the components which are (selectively) connected to each other (switching device activated).

Such a selective connection can be released again by the switching device so that in this instance no torque can be transmitted between these two components (switching device deactivated).

Tests have shown that with combined spur gear planetary gearboxes, a particularly compact structure can be achieved, in particular when the first idler gear can be connected to the gear housing in a selective and torque-transmitting manner. It is thus possible in a particularly simple manner to predetermine the speed zero for at least a portion of the toothed wheels (first spur gear, fourth spur gear).

A further size reduction of the spur-gear planetary gearbox can in particular be achieved by there being arranged on the spur gear shaft a second idler gear which can be connected to the spur gear shaft in a selective and torque-transmitting manner, wherein this second idler gear is configured to mesh with a third planetary gear which is arranged concentrically with respect to the planetary axle.

In a preferred embodiment of the spur-gear planetary gearbox, the spur gear shaft and the planetary gear shaft are configured to transmit power from and to the spur-gear planetary gearbox. In this instance, in the context of the invention, the term transmission of power from and to the spur-gear planetary gearbox is intended to be understood to mean that a drive power, in particular from a drive machine, such as a piston engine, a drive power (torque, speed) can be supplied to the gear mechanism from the outer side (spur gear shaft). Furthermore, such a drive power (speed, torque) can be discharged to the outer side of the gear mechanism (planetary gear shaft), in particular to at least one drivable wheel of the motor vehicle. Preferably, the spur gear shaft and the planetary gear shaft are intended to be understood to be a gear input shaft or gear output shaft and vice versa. Tests have shown that, with a configuration in which the gear input shaft is constructed as a spur gear shaft and the gear output shaft is constructed as a planetary gear shaft, particularly compact dimensions of the spur-gear planetary gearbox can be achieved.

In a preferred embodiment, the first planetary gear is connected to the planetary gear shaft. Preferably, the first planetary gear is connected to the planetary gear shaft in such a manner that this connection cannot be separated during normal operation of the spur-gear planetary gearbox. Such a connection generally has a smaller construction space requirement compared with a selective connection and enables the spur-gear planetary gearbox to be made more compact.

In a further preferred embodiment, the first and the second planetary gear are arranged concentrically relative to the planetary axle and are spaced apart from each other in the direction thereof (axial direction). Furthermore, these planetary gears are spaced apart from each other in such a manner that the first planetary gear set and the second planetary gear set are arranged in an axial direction between these planetary gears. In this instance, in this context, the term "between these" is intended to be understood to mean that the portions of the planetary gear sets involved in the transmission of movement from one toothed wheel to the other toothed wheel are arranged in an axial direction within the first and second planetary gear. In particular, as a result of such an arrangement of the planetary gears and the planetary gear sets, a nesting of the spur-gear planetary gearbox and consequently size reduction thereof is enabled.

In a preferred embodiment of the spur-gear planetary gearbox, the first idler gear and the second idler gear which are both arranged on the spur gear shaft and which are preferably arranged in an axial direction adjacent to each other can be connected to each other in a selective and torque-transmitting manner. In particular as a result of the selective connection of the first and second idler gear, an additional and particularly simple switching of the speed ratios of the spur-gear planetary gearbox can be achieved and, in particular, further size reduction of this gear mechanism can thereby be achieved.

In a preferred embodiment, the second idler gear can be connected to the spur gear shaft in a selective and torque-transmitting manner. In a further preferred manner, the second idler gear is connected to the spur gear shaft. In particular as a result of the selective connectivity, it is possible in a simple manner to achieve another possibility for changing the speed ratios and consequently further size reduction of the spur-gear planetary gearbox can be produced.

In a preferred embodiment of the spur-gear planetary gearbox, the second idler gear which is arranged on the spur gear shaft meshes with the third planetary gear and it is orientated concentrically with respect to the planetary axle. The third planetary gear can be connected to the ring gear of at least one of the planetary gear sets, preferably to the ring gear of the first planetary gear set. Preferably, this third planetary gear and the ring gear are arranged coaxially or concentrically with respect to each other. In a further preferred manner, the third planetary gear and the ring gear of the first planetary gear set are connected to each other, preferably constructed integrally with each other. In a further preferred manner, the third planetary gear and the ring gear of the first planetary gear set are intended to be understood to be an annular device/component with an external tooth arrangement (third planetary gear) and a ring gear tooth arrangement (ring gear of the first planetary gear set). In particular as a result of a third planetary gear which is connected to one of the ring gears, a particularly compact structure of the spur-gear planetary gearbox can be achieved.

In a preferred embodiment, one sun pinion shaft of the first planetary gear set can be connected to the second planetary gear in a selective and torque-transmitting manner. In the context of the invention, the terms sun pinion or sun gear and sun pinion shaft are used as equivalents. Preferably, a switching device for producing this selective connection is arranged at least partially or completely, with respect to the axial direction, at the side of the second planetary gear which faces away from the first planetary gear set. In a further preferred manner, the ring gear of the first planetary gear set can be connected to the second planetary gear in a selective and torque-transmitting manner. In a further preferred manner, a switching device to produce this connection, with respect to the axial direction, is arranged at the side of the second planetary gear which faces the second planetary gear set. Tests have shown that, in particular with such connections, a particularly compact structure of the spur-gear planetary gearbox can be achieved.

In a preferred embodiment of the spur-gear planetary gearbox, the first planetary gear set has at least a first planetary gear, preferably a large number of first planetary gears, and the second planetary gear set has at least a second planetary gear, but preferably a large number of second planetary gears. Preferably, a first planetary gear meshes with one of these second planetary gears in each case. In a further preferred manner, at least a first planetary gear meshes with the ring gear and preferably with the sun pinion of the first planetary gear set, preferably all the first planetary gears mesh with this ring gear and preferably with this sun pinion.

Preferably, a second planetary gear meshes with the sun pinion and preferably with a ring gear of the second planetary gear set, preferably all the second planetary gears mesh with this sun pinion and preferably with this ring gear. In a further preferred manner, at least a first, preferably all the first, and a second, preferably all the second, planetary gears are rotatably supported on a common planetary gear carrier, in particular the planetary gear carrier of the first planetary gear set.

Preferably, at least one planetary gear is supported on the planetary gear carrier by means of a plain bearing, preferably by means of a roller bearing. Preferably, a large number of these planetary gears are supported on the planetary gear carrier in this manner, preferably all the planetary gears are supported in a sliding manner and, in a particularly preferred manner, supported in a rolling manner.

Such a planetary gear mechanism having a first planetary gear set and a second, in particular reduced, planetary gear set may be understood to be a so-called Ravigneaux gear set and, in particular as a result of this, a particularly compact structure of the spur-gear planetary gearbox is achieved.

In a preferred embodiment, at least one planetary gear carrier and preferably the common planetary gear carrier can be connected to the gear housing in a selective and torque-transmitting manner. Preferably, the switching device for producing this selective connection has in an axial direction a greater spacing with respect to the first planetary gear set than to the second planetary gear set. In particular, there can be achieved as a result of the ability to connect the planetary gear carrier to the gear housing a particularly large gear spread and a small construction space requirement of the spur-gear planetary gearbox.

According to the invention, a direct, and also indirect, coupling of one of the toothed wheels (idler gears, spur gears, planetary gears) to the gear housing is enabled. A direct or immediate coupling is in the context of the invention intended to be understood to mean that a switching device is arranged, on the one hand, on the toothed wheel and, on the other hand, on the gear housing and that this toothed wheel and the gear housing can be contacted by this switching device in order to transmit torque. In the context of the invention, an indirect or mediate coupling of one of the toothed wheels to the gear housing is intended to be understood to mean a kinematic coupling thereof to each other. Preferably, for such an indirect coupling, another toothed wheel which meshes with this toothed wheel can be connected to the gear housing by means of a switching device. As a result of a rolling contact between this toothed wheel and the additional toothed wheel which meshes therewith, it can be connected to the gear housing indirectly or in a mediate manner by means of the switching device.

In a preferred embodiment of the spur-gear planetary gearbox, at least one of the second planetary gears meshes with a sun pinion of the second planetary gear set and the outer diameter of this second sun pinion is preferably smaller than the outer diameter of the first sun pinion. In particular as a result of this diameter graduation of the first and the second sun pinion, a particularly good gear spread and compact structural shape of the spur gear planetary gearbox can be achieved.

In the context of the invention, the diameter or outer diameter of one of the sun pinions is intended to be understood to be the outer diameter (tip diameter) of the sun pinion in a range which is configured to transmit movement to one of the planetary gears.

In a preferred embodiment, at least one of the gear elements from the following group can be connected to the gear housing in a selective and torque-transmitting manner:
planetary gear carrier of the first, second planetary gear set, common planetary gear carrier,
sun pinion shaft of the first planetary gear set, sun pinion of the second planetary gear set,
first, second idler gear,
first, second, third planetary gear.

Preferably, three of the gear elements mentioned above can be connected to the gear housing.

Preferably, the first idler gear, the second planetary gear and the common planetary gear carrier can be connected to the gear housing in a selective and torque-transmitting manner. In particular as a result of the connection of these gear elements, on the one hand, a high gear spread and, on the other hand, a compact structure of the spur gear planetary gearbox are enabled.

Using a spur-gear planetary gearbox according to the invention, particularly compact and efficient drive trains for motor vehicles can be constituted.

In the context of the invention, a drive train is intended to be understood to be a device which comprises at least one drive machine, preferably an internal combustion engine, preferably a piston engine, a spur-gear planetary gearbox according to the invention and at least one drivable wheel, preferably a plurality of drivable wheels, and means for connecting the drive machine to the spur-gear planetary gearbox and for connecting the spur-gear planetary gearbox to the drivable wheel. Preferably, in such a drive train the spur gear shaft can be coupled to at least one drive machine. Preferably, the planetary gear shaft is configured as an output shaft of the spur-gear planetary gear device and outputs the drive power in the direction toward the at least one drivable wheel. In this instance, in the context of the invention, a wheel is intended to be understood to be a wheel tire of a motor vehicle. Preferably, the gear device according to the invention is provided for so-called "transverse installation" in the motor vehicle. In this instance, in this context, the term transverse installation is intended to be understood to mean that the spur gear shaft is arranged at least substantially transversely, preferably at an angle of 90°, with respect to the main travel direction of the motor vehicle. In particular in a transverse installation situation, using the drive train according to the invention, a particularly space-saving construction can be achieved. In a further preferred manner, there is produced according to the invention a gear device for longitudinal installation in a motor vehicle. In this instance, a longitudinal installation is intended to be understood to mean that the spur gear shaft is arranged at least substantially parallel with the main travel direction of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
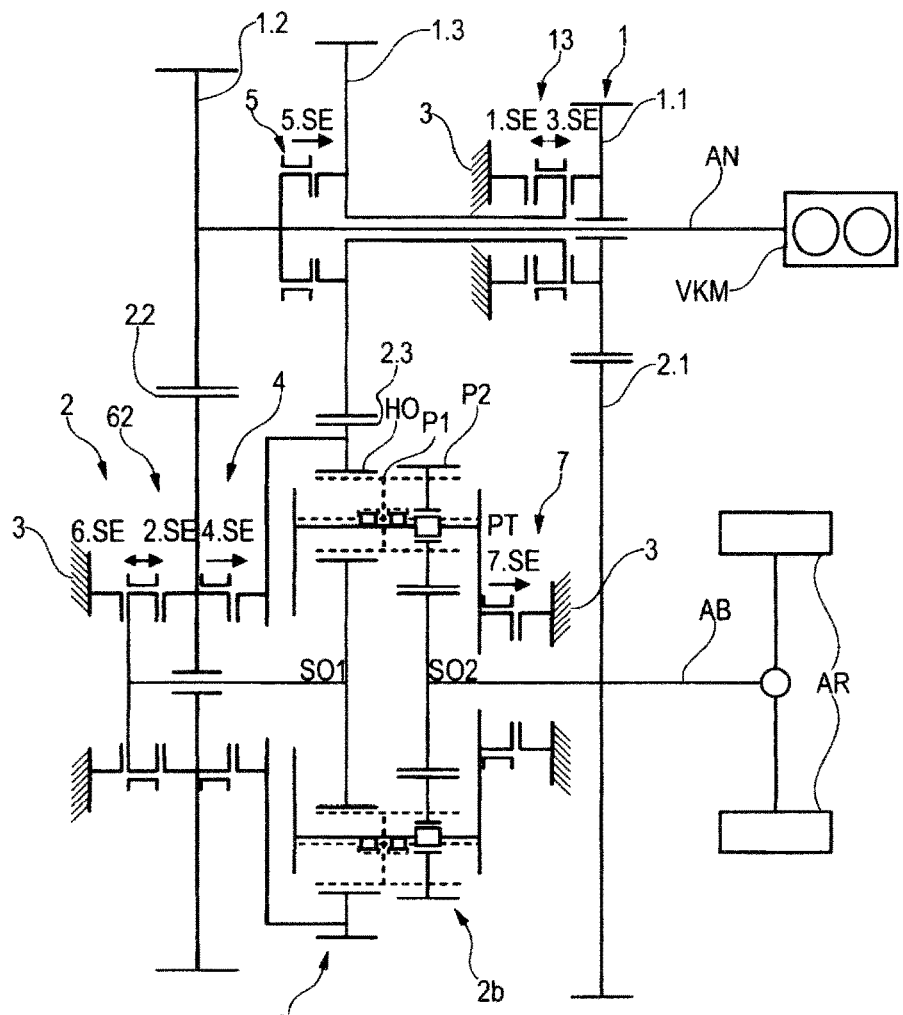
FIG. 1 is a longitudinal section through a combined seven-gear spur-gear planetary gearbox according to an embodiment of the invention.
FIG. 2 is a shifting diagram for such a combined seven-gear spur-gear planetary gearbox.

FIG. 1 is a longitudinal cross section through a vehicle gearbox. The vehicle gearbox has a first part-gearbox 1 which is constructed as a spur gear mechanism and a second part-gearbox 2 which is constructed as a planetary gear mechanism with two planetary gear sets 2a, 2b. The power supply (speed, torque) to the vehicle gearbox is carried out via the spur gear shaft AN and the output is carried out via the planetary gear shaft AB which coincides with the planetary axle. The first part-gearbox 1 has a first idler gear 1.1, a second idler gear 1.3 and a spur gear 1.2.

The drive power (speed, torque) is supplied to the vehicle gearbox and consequently to the drive train via the internal combustion engine VKM. By means of the vehicle gearbox, the transmission ratio between the shafts AN/AB can be adapted and the drive power can be transmitted via the planetary gear shaft AB to the drivable wheels AR.

The first idler gear 1.1 can be connected by means of a torque transmission device 13, in which a switching device 1.SE and 3.SE are structurally combined, to the second idler gear 1.3 in a selective and torque-transmitting manner. The first switching device 1.SE is configured to selectively connect the second idler gear 1.3 to the gear housing 3.

The first idler gear 1.1 meshes with a first planetary gear 2.1; this first planetary gear 2.1 is arranged coaxially with respect to the planetary gear shaft AB. The spur gear 1.2 meshes with a second planetary gear 2.2, this second planetary gear is also arranged coaxially with respect to the planetary gear shaft AB. The second planetary gear 2.2 has a torque transmission device 62 in which the switching device 6.SE and 2.SE are structurally combined and an additional torque transmission device 4 which has the switching device 4.SE.

The second idler gear 1.3 meshes with the third idler gear 2.3 and it is arranged concentrically with respect to the ring gear HO and constructed integrally therewith.

As a result of the switching device 2.SE, the second planetary gear 2.2 can be connected to the sun pinion shaft SO1 of the first planetary gear set 2a. By means of the switching device 6.SE, this sun pinion shaft SO1 can be connected to the gear housing 3. In this instance, the torque transmission device 62 is configured in such a manner that in each case only the switching device 2.SE or the switching device 6.SE can be activated. In this instance, activation is intended to be understood to mean that a torque can be transmitted from the switching device.

By means of the torque transmission device 5, which has the switching device 5.SE, the second idler gear 1.3 can be connected to the spur gear shaft so that a power can be transmitted therefrom to the ring gear HO of the first planetary gear set 2a. Furthermore, the second idler gear 1.3 can be connected via the switching device 1.SE to the gear housing 3 and consequently braked; in this instance, the spur gear shaft AN remains rotatable as long as the switching device 5.SE is deactivated at the same time. If both switching devices 1.SE and 5.SE are activated, blocking of the spur gear shaft AN is enabled. The ring gear HO is arranged concentrically with respect to the planetary gear shaft AB. By means of the torque transmission device 7, which has the switching device 7.SE, the common planetary gear carrier PT of the planetary gear 2 can be connected to the gear housing 3.

The torque transmission device 13 is also configured in such a manner that only either the switching device 1. SE or 3.SE can be activated.

The first planetary gears P1 and the second planetary gears P2 are rotatably supported on the planetary gear carrier PT. The planetary gears P1 and P2 are supported on the planetary gear carrier PT in such a manner that they mesh with each other. The first planetary gears P1 additionally mesh with the ring gear HO and the sun pinion SO1. The second planetary gears P2 mesh with the sun pinion SO2 of the second planetary gear set and with the planetary gears P1.

If one of the gear elements is connected to the gear housing 3, specifically the sun pinion shaft SO1 to the switching device 6.SE, the planetary gear carrier PT to the switching device 7.SE or the second idler gear 1.3 to the switching device 1.SE, this gear element is stopped and has the speed zero. As a result of the selective coupling of these gear elements to the gear housing 3, on the one hand, and the selective coupling of gear elements to each other via the switching devices 2.SE, 3.SE, 4.SE and 5SE, a reverse gear and seven forward gears can be constituted with this spur-gear planetary gearbox. In this instance, the torque transmission devices (4, 5, 7, 13, 62) are configured in such a manner that for a gear stage (reverse gear and first to seventh gear) only two switching devices (1.SE to 7.SE) are activated in each case.

FIG. 2 shows a shifting diagram for a vehicle gearbox. In the table shown in FIG. 2, the grey regions indicate that a switching device (1.SE to 7.SE) is activated. The shifting diagram shows that only two switching devices are activated in each case for a gear. With the vehicle gearbox according to the invention, seven (1st gear to 7th gear) forward gears in the main travel direction and one reverse gear (R gear) in the opposite travel direction can be constituted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spur-gear planetary gearbox with multiple ratios, comprising:
 a spur gear mechanism having at least a first idler gear which is arranged concentrically with respect to a spur gear shaft, and having a spur gear which is connected to the spur gear shaft;
 a planetary gear mechanism having at least a first planetary gear set and a second planetary gear set and a planetary gear shaft, which is rotatable about a planetary axle, wherein at least one of the planetary gear sets is arrangable concentrically with respect to the planetary axle, and planet gears of the first planetary gear set and planet gears of the second planetary gear set are located on a common planet carrier;
 a first planetary gear and a second planetary gear which are arranged concentrically with respect to the planetary axle;
 a gear housing and a number of switching devices, wherein
 the first idler gear meshes with the first planetary gear and the spur gear meshes with the second planetary gear,
 a second idler gear is arranged on the spur gear shaft and is connectable thereto in a selective and torque-transmitting manner,
 the first idler gear is connectable to the gear housing in a selective and torque-transmitting manner, and
 a third planetary gear is arranged concentrically with respect to the planetary axle and meshes with the second idler gear.

2. The spur-gear planetary gearbox with multiple ratios according to claim 1, wherein
 the first planetary gear is connected to the planetary gear shaft.

3. The spur-gear planetary gearbox with multiple ratios according to claim 1, wherein
 the first and the second planetary gear set are arranged in an axial direction between the second planetary gear and the first planetary gear.

4. The spur-gear planetary gearbox with multiple ratios according to claim 1, wherein
 the first idler gear and the second idler gear are connectable to each other in a selective and torque-transmitting manner.

5. The spur-gear planetary gearbox with multiple ratios according to claim 1, wherein
 the second idler gear is connectable to the spur gear shaft in a selective and torque-transmitting manner.

6. The spur-gear planetary gearbox with multiple ratios according to claim 1, wherein
 the third planetary gear is connected to a ring gear of the first planetary gear set.

7. The spur-gear planetary gearbox with multiple ratios according to claim 1, wherein a sun pinion shaft of the first planetary gear set is connectable to the second planetary gear in a selective and torque-transmitting manner.

8. The spur-gear planetary gearbox with multiple ratios according to claim 1, wherein
a ring gear of the first planetary gear set is connectable to the second planetary gear in a selective and torque-transmitting manner.

9. The spur-gear planetary gearbox with multiple ratios according to claim 1, wherein
the first planet gears mesh with the second planet gears,
the first planet gears additionally meshes with a ring gear of the first planetary gear set.

10. The planetary gearbox with multiple ratios according to claim 7, wherein
the second planetary gear set has a second sun pinion shaft connected to the first planetary gear.

11. The planetary gearbox with multiple ratios according to claim 10, wherein
an outer diameter of the first sun pinion shaft, in a region which is configured to transmit movement to the first planetary gear, is greater than an outer diameter of the second sun pinion shaft in the region which is configured to transmit movement to the second planetary gear.

12. The planetary gearbox with multiple ratios according to claim 1, wherein
at least one of the following gear elements is connectable to the gear housing in a selective and torque-transmitting manner:
a planetary gear carrier of the first or second planetary gear set or a common planetary gear carrier,
a sun pinion shaft of the first planetary gear set,
the second idler gear.

13. A drive train for a motor vehicle, comprising:
an internal combustion engine;
at least one or more drivable wheels; and
a spur-gear planetary gearbox with multiple ratios according to claim 1.

14. The drive train according to claim 13, wherein
the motor vehicle is a passenger car.

\* \* \* \* \*